United States Patent [19]
Battlogg

[11] Patent Number: 5,481,778
[45] Date of Patent: Jan. 9, 1996

[54] WINDSHIELD WIPER SYSTEM WITH EXTENDABLE WIPER ARM AND ADJUSTABLE BLADE PRESSURE

[76] Inventor: Stefan Battlogg, Haus Nr. 26, A-6771 St. Anton I.M., Austria

[21] Appl. No.: 164,257

[22] Filed: Dec. 8, 1993

Related U.S. Application Data

[63] filed as PCT/AT92/00078, Jun.17, 1992.

[30] Foreign Application Priority Data

Jun. 18, 1991 [AT] Austria .................................. A 1223/91

[51] Int. Cl.⁶ ............................... B60S 1/32; B60S 1/20; B60S 1/44; B60S 1/36
[52] U.S. Cl. ................... 15/250.202; 15/250.21; 15/250.23; 15/250.352; 15/250.16
[58] Field of Search ........................ 15/250.20, 250.35, 15/250.34, 250.19, 250.23, 250.21, 250.16

[56] References Cited

U.S. PATENT DOCUMENTS

| | | | |
|---|---|---|---|
| 2,715,239 | 8/1955 | Mintz | 15/250.35 |
| 3,480,985 | 12/1965 | Forster | 15/250.35 |
| 4,318,201 | 3/1982 | Rogers et al. | 15/250.2 |

FOREIGN PATENT DOCUMENTS

| | | | |
|---|---|---|---|
| 201838 | 4/1955 | Australia | 15/250.2 |
| 880864 | 6/1953 | Germany | 15/250.34 |
| 1555256 | 6/1970 | Germany | 15/250.2 |
| 605228 | 5/1960 | Italy | 15/250.2 |
| 93653 | 6/1983 | Japan | 15/280.2 |
| 2225218 | 5/1990 | United Kingdom | 15/250.23 |

*Primary Examiner*—Gary K. Graham
*Attorney, Agent, or Firm*—Herbert L. Lerner; Laurence A. Greenberg; Werner H. Stemer

[57] ABSTRACT

The wiper arm of a windshield wiper system for passenger vehicles is oscillatingly driven across the windshield and the contact pressure of the wiper blade is varied during the oscillatory motion. A driven basic body is pivoted on a pivot bearing mounted on the passenger vehicle. The wiper arm includes a wiper arm member attached to the basic body and it is resiliently biased towards the windshield. A control cam is formed at the pivot bearing and a cam follower, which is operatively associated with the wiper arm, follows the cam surface during the oscillation of the wiper arm across the windshield. The contact pressure of the wiper arm and the wiper blade onto the windshield are thus varied. The wiper arm member is formed as a leaf spring which is rigidly connected to the basic body and which is operatively associated with the cam follower.

12 Claims, 4 Drawing Sheets

WINDSHIELD WIPER SYSTEM WITH EXTENDABLE WIPER ARM AND ADJUSTABLE BLADE PRESSURE

CROSS-REFERENCE TO RELATED APPLICATION

This application is a Continuation of International Application Serial No. PCT/AT92/00078, filed Jun. 17, 1992.

BACKGROUND OF THE INVENTION

1. Field of the Invention

The invention relates to a windshield wiper system, in particular for passenger vehicles, with at least one wiper arm having a pivot drive, a wiper blade disposed at the free end of the wiper arm, and a driven basic body disposed on a pivot bearing and a wiper arm member disposed at the base body which is spring-biased towards the vehicle windshield, and with a cam formed at the pivot bearing of the wiper arm along which a cam follower is guided during the pivoting motion for altering the contact pressure of the wiper arm. The cam follower is associated with the wiper arm.

2. Description of the Related Art

A windshield wiper system of that general kind is shown in German Published, Non-Prosecuted Application DE-A-40 28 494. The wiper arm member carrying the wiper blade is pivotable about a joint axis on a basic body. The basic body is disposed on a drive shaft. The pivotable wiper arm member is acted on by a tension spring, which is hooked into the wiper arm member and at a lever which is pivotally mounted on the joint axle. At the other end, the lever carries a follower roller which follows the cam, so that the tension in the tension spring is altered during the pivoting of the lever.

SUMMARY OF THE INVENTION

It is accordingly an object of the invention to provide a windshield wiper system, which overcomes the hereinafore-mentioned disadvantages of the heretofore-known devices of this general type and which allows transmitting the varying contact pressure required in each pivot position to the wiper arm in a most simple manner.

In general, the object is achieved in the context of this invention in that the wiper arm member is formed by a leaf spring which is rigidly connected with the basic body and with which the cam follower is associated. Preferably, the wiper arm member formed by the leaf spring is made of a fiber-reinforced plastic.

With the foregoing and other objects in view there is provided, in accordance with the invention, a windshield wiper system, particularly for passenger vehicles, comprising:

a wiper arm having a free end, means for pivoting the wiper arm about a given pivot axis opposite the free end, and a wiper blade disposed at the free end of the wiper arm;

the means for pivoting the wiper arm including a pivot bearing and a driven basic body disposed on and pivotable about the pivot bearing;

the wiper arm including a wiper arm member attached to the basic body and means for resiliently biasing the wiper blade towards a windshield;

a control cam with a cam surface formed at the pivot bearing, and cam follower means operatively associated with the wiper arm for following the cam surface of the control cam during an oscillatory motion of the wiper arm across the windshield and for varying a contact pressure of the wiper arm onto the windshield;

the wiper arm member being formed by a leaf spring rigidly connected with the basic body and being operatively associated with the cam follower means.

Embodying the wiper arm element as a leaf spring obviates a transverse pivot axis between the wiper blade member and the basic body. This leads to a particularly simple construction and a virtually play-free configuration. With an appropriate choice of cam surface, for instance by exchanging the member of the pivot bearing which carries the cam, the contact pressure can be adjusted to any desired type of wiper system, to the size and curvature of the windshield, and much more. It is particularly advantageous that the contact pressure can be substantially increased just before reaching the reversal regions of the wiper arm and that it can be reduced in the reversal regions.

In accordance with an added feature of the invention, the cam follower means are in the form of a springy tongue projecting away from the wiper arm member, wherein the control cam is disposed on the bottom of the pivot bearing, and the springy tongue reaches under the control cam below the pivot bearing.

In other words, the cam follower element can be formed of a springy tongue projecting away from the wiper arm. The tongue reaches under the region of the pivot drive carrying the control cam. The axes of curvature of the control cam can thereby be perpendicular to the pivot axis of the wiper arm. This reduces the structural height of the wiper arm.

In accordance with an additional feature of the invention, the wiper arm member has two longitudinal slits formed therein and the springy tongue is defined between the slits.

In accordance with another feature of the invention, the windshield wiper system includes two lateral parts formed laterally outside of the longitudinal slits, the lateral parts being attached to the basic body.

In accordance with a further feature of the invention, the lateral parts are attached to the basic body at defined connecting locations, the tongue extending beyond the connecting locations of the lateral parts at the basic body towards the pivot bearing.

In accordance with again an added feature of the invention, the two lateral parts formed outside of the longitudinal slits are integrally formed in one piece with the basic body, and each the lateral parts has predetermined bending locations formed thereon at a point of attachment, or in close proximity thereof, between the lateral parts and the basic body.

A wiper-specific basic adjustment of the spring force can thus be achieved for example by narrowing the cross section (cut-in notching or the like). That embodiment is particularly suited for wiper arms with mutually telescoping wiper arm members. In that case, the wiper arm member extending from the basic body forms a rail for the second wiper arm member, i.e. the outer arm member with which the wiper blade is associated.

In accordance with again another feature of the invention, the springy tongue is a tongue member attached at a bottom portion of the wiper arm member.

In accordance with again an additional feature of the invention, the cam follower means is formed as a bump provided on the wiper arm member and pointing towards the control cam.

The springy tongue can project towards the pivot axis beyond the attachment point or the origin of the wiper arm member at the basic body, i.e. its attachment or its predetermined bending location. The springy tongue may either be a part of the wiper arm member, or it may be attached thereto as a separate member.

In accordance with a concomitant feature of the invention, the windshield wiper system includes a helical spring supported on the wiper arm member, and a pin forming the cam follower means, the pin being shiftably supported in the basic body and being biased between the control cam surface and the helical spring.

In other words, the control cam may also be formed at a circumferential groove formed in the pivot bearing. The cam thus has axes of curvature which are oriented parallel to the pivot axis. Particularly in that case, the cam follower element is preferably formed as a pin which is shiftably mounted in the basic body and which is pressed against the control cam by a helical spring supported at the wiper arm member.

When the leaf spring is the only spring, then it serves to produce the contact pressure by itself. This means that it is provided with a certain pre-bias or pretension, which increases or decreases as the follower element is guided along the control cam. If, however, an additional spring is provided, as for instance a springy tongue or the helical spring, then the bias of the additional spring can be used to increase or decrease the contact pressure of the leaf spring. If a maximum contact pressure is given by the leaf spring, it is reduced in the region of lesser contact pressure by means of a counter force (spring tongue, helical spring). The leaf spring may also be pre-biased with a minimum contact pressure which is then increased for the regions of greater contact pressure requirements.

Other features which are considered as characteristic for the invention are set forth in the appended claims.

Although the invention is illustrated and described herein as embodied in a windshield wiper system, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
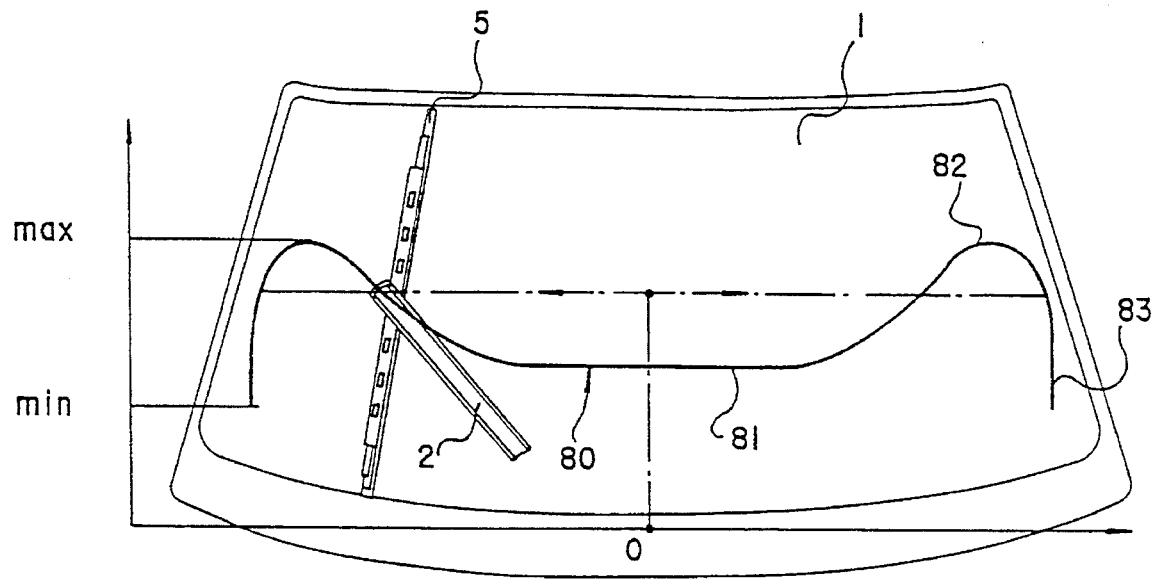
FIG. 1 is a plan view onto a windshield with a wiper blade which can be guided essentially over the full surface across the windshield, and the graphed function with the values of the contact pressure associated with the various wiper blade positions.

Referring now to the figures of the drawing in detail and first, particularly, to FIG. 1 thereof, there is seen a windshield 1 of a motor vehicle and a single-arm windshield wiper system. The wiper system includes a wiper arm 2, which is formed of telescopic wiper arm members 84 and 85. The telescopic wiper arm member 85 carries a wiper blade 5 at its free end which, during the wiping motion, is guided essentially parallel across the windshield. The parallel motion is caused by drive cables 7 and 15 (FIGS. 2, 3) and it leads to virtually full-surface wiping of the windshield. My copending application Ser. No. 08/157,193, published as WO 92/22445, provides additional information with regard to the blade-guide mechanism and that disclosure is herewith incorporated by reference.

Starting from a center position—indicated with 0 on the carthesian x-axis—the wiper arm deflects left and right, whereby the wiper arm member 85 is telescoped outwardly away from the pivot axis. Due to the fact that the force causing the contact pressure is introduced through a torque, the lengthening of the wiper arm by itself, without any additional measures, reduces the contact pressure with which the wiper blade 5 is pressed or biased against the windshield 1. Add to that the curvature of the windshield 1 towards its lateral edges, then the contact pressure is reduced even more. The contact pressure should, however, be increased at least towards the end of the pivot path, so that a substantially even wiping quality it achieved. Quite importantly, also, aerodynamically induced or draught-induced lifting of the wiper blade 5 must be avoided. The pressure should then become small in the reversal region at the end of the pivot path, so as to relieve the wiper blade rubber as its attack angle is reversed.

An optimized contact pressure curve is shown at 80 in the coordinate system of FIG. 1. The contact pressure has a relatively small value 81 in the center region, it increases towards the lateral edges to a maximum 82 and it drops in the last section, in which the wiper blade rubber is reversed, to a minimum 83, which is smaller than the central region with the relatively small value 81.

Figure 2:
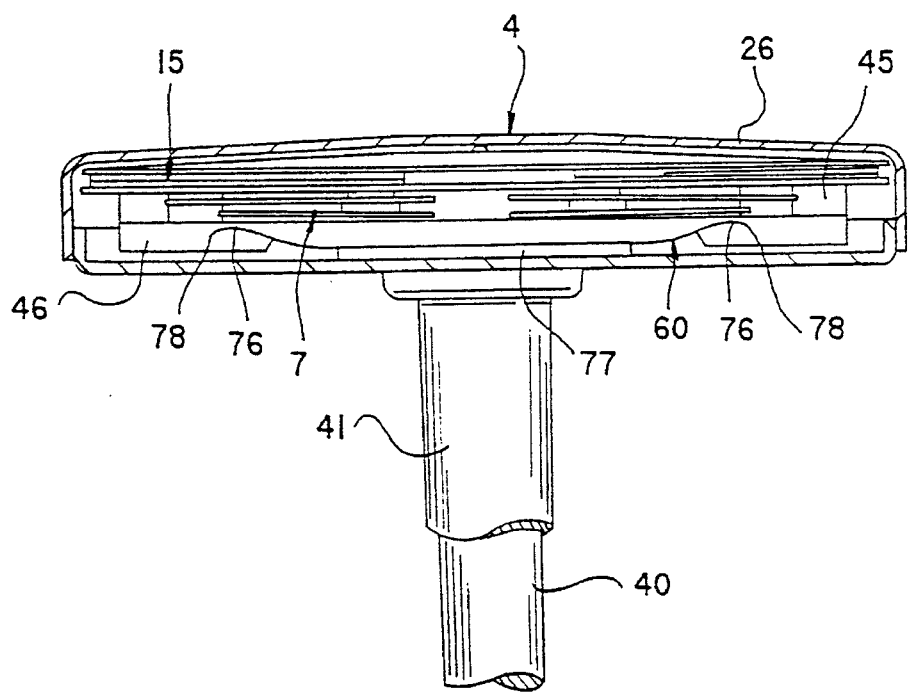
FIG. 2 is a sectional view of the basic body of the wiper arm disposed in the pivot bearing, showing a first embodiment of the control cam.
Figure 3:
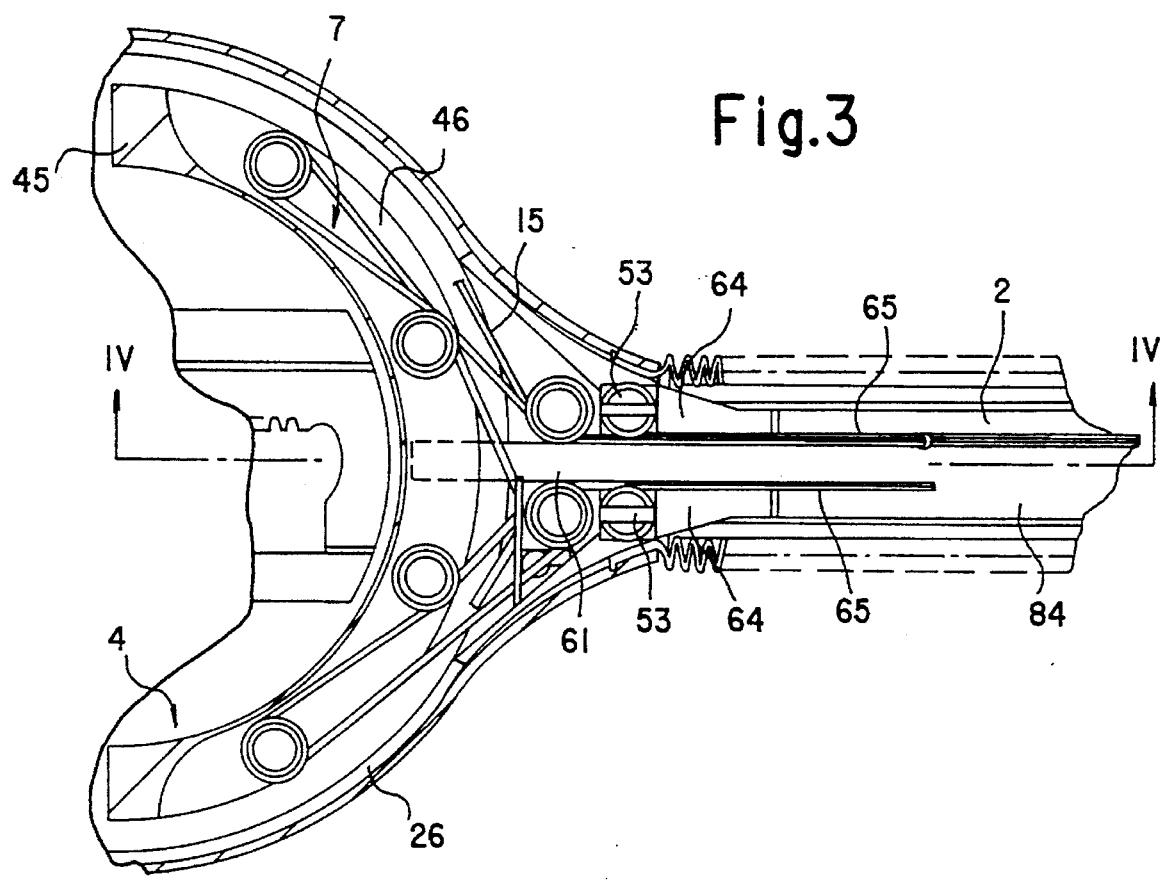
FIG. 3 is a fragmentary, plan view onto the region of attachment of the wiper arm on the basic body.
Figure 4:
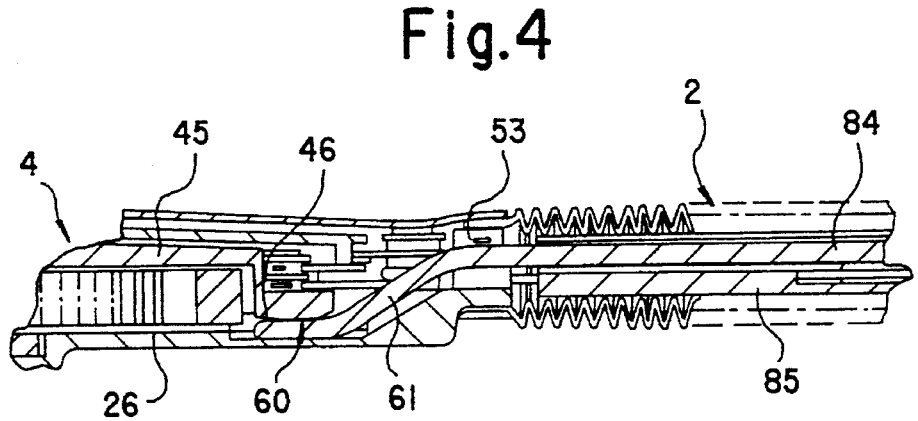
FIG. 4 is a fragmentary, cross-sectional view taken along the line IV—IV in FIG. 3.
Figure 8:
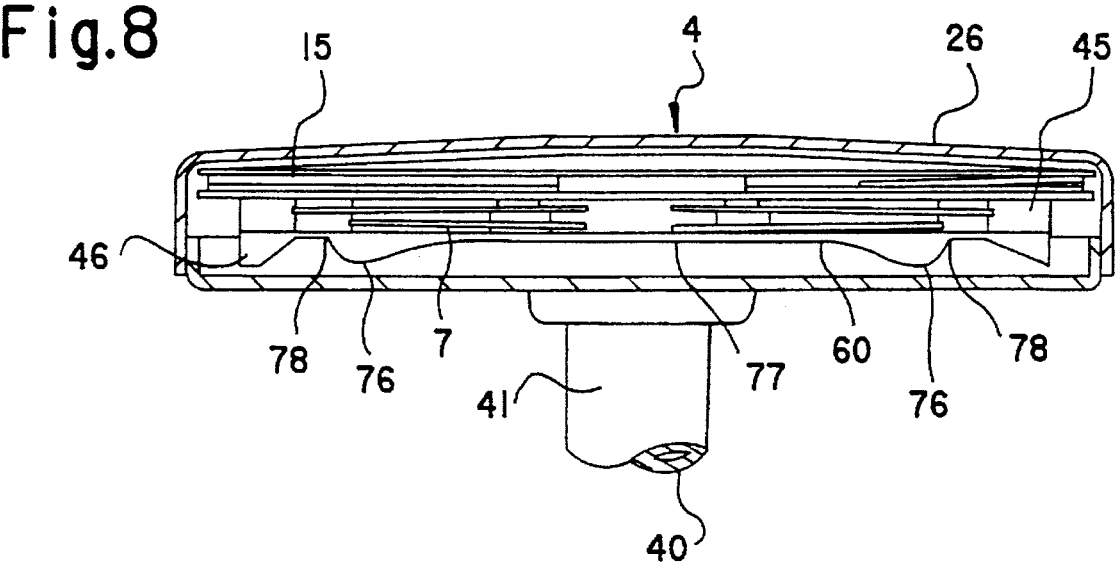
FIG. 8 is a view similar to FIG. 2, showing a second embodiment of the control cam.

The contact pressure adapted to the optimized contact pressure curve 80 can now be structurally attained in a very simple manner. For that purpose, the tension of the wiper arm spring which causes the contact pressure is influenced, at least in the end regions of the pivot motion, by means of a control cam 60. With reference to FIGS. 2 and 8, the control cam 60 is formed at a pivot bearing 4.

The wiper system oscillates about the central axis of a basic body 26, which is pivotally mounted on a bearing trunnion 40 and driven via a hollow shaft 41. The basic body 26 includes a gearing for driving the drive cables 7 and 15 (which are not discussed in detail herein), and the wiper arm 2, i.e. the wiper arm element 84, is fixed to it by means of bolts or screws 53, or any other means of attachment.

The wiper arm member 84 of the embodiments according to FIGS. 3–6, 9 and 10 is a leaf spring formed of metal or fiber-reinforced plastic, which obviates a transverse axle for a movement of the wiper arm perpendicularly to the windshield 1. The wiper arm member 84 serves as a carrier rail for the telescoping wiper arm member 85. The lower end of the leaf spring of the embodiments according to FIGS. 3–6 and 10 has parallel longitudinal slits 65 which are open towards the pivot bearing 4; the mounting region or the joint region is divided by the slits 65 into a central springy tongue 61 and lateral parts 64.

According to FIGS. 3–6, the wiper arm member 84 is a part which is separate from the basic body and which is mounted at the basic body by means of screws 53. The springy tongue 61 is bent downwardly and extends beyond the lateral parts 64, whereby the end of the springy tongue 61 reaches under a member 45 of the pivot bearing 4. The member 45 is non-rotatably connected with the bearing trunnion 40 and at its bottom it has an edge region 46 on which a control cam 60 is formed. The axes of curvature of the cam 60 are thus disposed at various heights perpendicularly to the pivot axis.

The wiper arm member 84 forming the leaf spring has a high bias (it is strongly pre-tensioned), but the wiper blade 5 in the center position of the wiper arm (FIG. 3) is pressed against the windshield 1 with the relatively small value 81 of the contact pressure. This is due to the fact that the springy tongue 61 rests on the center part 77 of the control cam 60 in which it produces a relatively strong counter force. The counter force (or torque) thus reduces the contact pressure. When the wiper arm is pivoted away, then the springy tongue 61 glides on the control cam 60, first slowly and then more quickly, to the highest region or lobe 76 of the cam 60. At that point, the counter force of the tongue 61 is reduced, so that the contact pressure reaches its maximum 82 (substantially corresponding to the pre-bias of the wiper arm member 84). As the wiper arm 2 is further pivoted into the reversal region, the springy tongue 61 is moved down to the end 78 of the control cam 60. At that point, the tongue 61 counters the leaf spring to a maximum and the contact pressure is reduced to its minimum 83.

It is noted that the center surface 77 and the two ends 78 of the control cam 60 may be disposed at the same level, because, due to the extended wiper arm member 85 in the reversal position, the contact pressure (the force component of the wiper arm torque) is smaller in any case.

Figure 5:
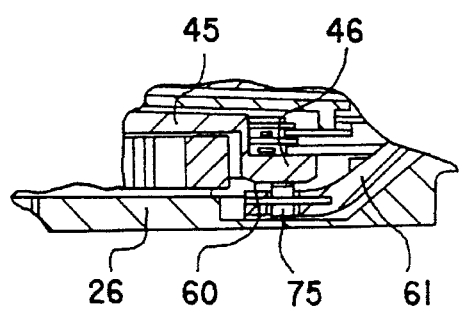
FIGS. 5–7 are cross-sectional views similar to FIG. 4 of three further embodiments.

With reference to FIG. 5, an anti-friction bearing 75, such as a roller bearing 75, may be provided at the springy tongue 61 for the purpose of reducing friction losses and wear between the tongue 61 and the cam 60. It is also possible to provide a friction-reducing coating.

Figure 6:
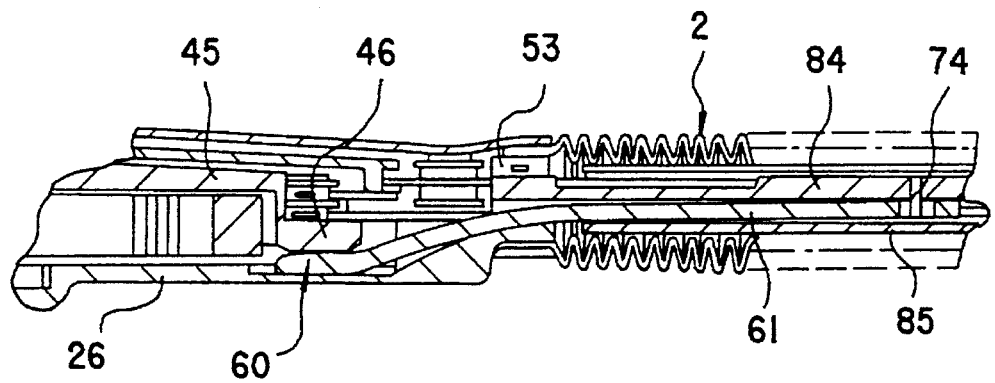

With reference to the embodiment of FIG. 6 the springy tongue 61 is not a unitary, integral part (embossed out) of the end part of the leaf spring. Instead, the tongue 61 is attached to the member 84 in any arbitrary manner (element 74). The leaf spring thus has no longitudinal slits and the attack point of the springy tongue 61 on the wiper arm is more remote from the pivot bearing 4. This makes possible different specifications in the leaf spring and in the springy tongue 61.

Figure 10:
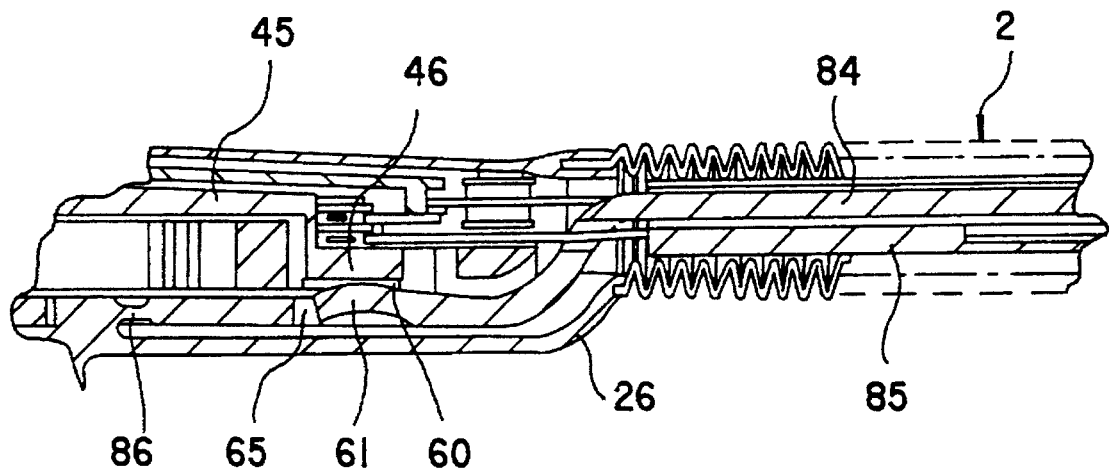

With reference to the embodiment of FIG. 10 the wiper arm member 84 is formed in one piece with the basic body 26 and it preferably consists of the fiber reinforced plastic. The mobile connection, which may be subject to pretension, is formed as a predetermined bending location 86, for instance a narrowing of material below the pivot bearing member 45. In that case, the springy tongue 61 is bent upwardly and pressed against the control cam 60. No additional connecting elements are necessary because of the unitary construction.

Figure 9:
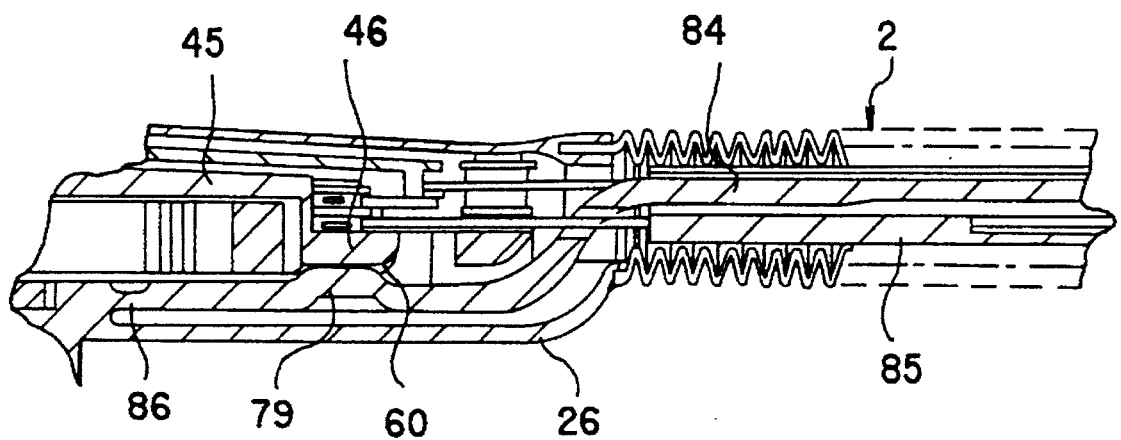
FIGS. 9 and 10 are cross-sections similar to FIG. 4 through two further embodiments.

In the similarly unitary embodiment of FIG. 9 the wiper arm member 84 carries a bump 79 in the vicinity of the predetermined bending location 86. The bump 79 faces towards the control cam and it acts as the cam follower.

The control cam 60 belonging to the embodiments of FIGS. 9 and 10 is illustrated in FIG. 8. It runs contrary to the cam surface according to FIG. 2. When the follower element of the wiper arm 2 lies in the center 77 of the control cam 60, then the wiper blade 5 is pressed against the windshield with a relatively small value 81 of the contact pressure. When the follower element, however, glides across the downwardly protruding regions 76, then the contact pressure is strongly increased, and it falls to the desired minimum 83 in the reversing positions at the two ends 78 of the control cam 60.

Since in the embodiments of of FIGS. 9 and 10 the connecting location or the bearing location of the wiper arm member 84 at the basic body 26 lies closer to the bearing trunnion 40 than to the control cam 60, contrary force conditions exist as compared to FIGS. 2–7. It is no longer a given great contact pressure which is reduced with a variable counter force, but a given small contact pressure is increased with a variable auxiliary force.

Figure 7:
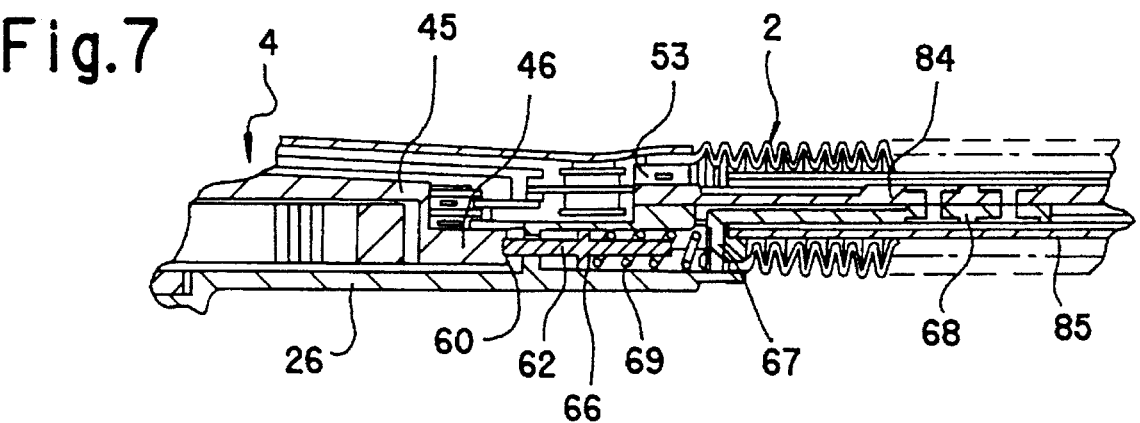

FIG. 7 shows an embodiment with a helical spring 69 disposed between a first counter bearing 66 at the follower element and a second counter bearing 67 at the wiper arm member 84. According to FIG. 7 the wiper arm member 84 is again formed by a leaf spring at which an L-shaped, angled support member 68 is attached. The angled support member 68 includes the second counter bearing 67. The helical spring 69 presses against the same, and the first counter bearing 66 of the helical spring 69 is formed as a ring shoulder of a pin 62. The pin 62 serves as a cam follower element. The pin 62 pushes against the control cam 60, which, in this embodiment, is formed on the periphery of the end region 46 of the member 45 on the bearing trunnion 40. The cam of this embodiment, therefore, has axes of curvature which are oriented parallel to the oscillatory or pivot axis.

The second counter bearing 67 can also be provided in a recess of the wiper arm member 84. The first counter bearing 66 is then provided in a follower element in the form of a hollow pin, which presses against the control cam 60.

In each of the embodiments according to FIGS. 6, 7, 9 and 10, the follower element 61, 62, 79 can be provided with a roller element 75 or a friction-reducing coating. The device for varying the contact pressure of the wiper blade 5 is not limited to the embodiments as described in detail which are provided with a telescopingly gliding wiper arm. It may also be applied to non-telescoping wiper arms of single or multi-arm wipers of conventional structure, whereby the control cams 60 of those embodiments are adapted to the respectively required contact pressure curves 80.

When the springy tongue is attached at the bottom of the wiper arm member outside of the basic body, then the point of attack of the force applied by the springy tongue lies outside the basic body, at a relatively great distance from the pivot axis.

As described above in the context of the preferred embodiment, the tongue can be provided between two longitudinal slits, in which case the two lateral parts formed outside the longitudinal slits are attached at the basic body. It is also possible and within the scope of this invention, however, for the lateral parts to form the tongue and for the central region to point away from the basic body.

I claim:

1. A windshield wiper system, comprising:

a wiper arm having a free end, means for pivoting said wiper arm about a given pivot axis opposite said free end, and a wiper blade disposed at said free end of said wiper arm;

means for telescopically extending said wiper arm such that said free end travels along a substantially horizontal line across a windshield during an oscillatory motion of said wiper arm across a windshield as said wiper arm is pivoted about said pivot axis;

said means for pivoting said wiper arm including a pivot bearing and a driven basic body disposed on and pivotable about said pivot bearing;

said wiper arm including a wiper arm member attached to said basic body and means for resiliently biasing said wiper blade towards the windshield;

a control cam with a cam surface attached to said pivot bearing, and cam follower means attached to said wiper arm member for following the cam surface of said control cam during the oscillatory motion of said wiper arm across the windshield and for varying a torque defining a contact pressure of said wiper blade on the windshield; and wherein said wiper arm member is formed by a leaf spring rigidly connected with said basic body and is attached to said cam follower means.

2. The windshield wiper system according to claim 1, wherein said cam follower means are in the form of a springy tongue projecting away from said wiper arm member, wherein said control cam is disposed on a bottom of said pivot bearing, and said springy tongue reaches under said control cam below said pivot bearing.

3. The windshield wiper system according to claim 2, wherein said wiper arm member has two longitudinal slits formed therein, said springy tongue being defined between said slits.

4. The windshield wiper system according to claim 3, including two lateral parts formed laterally outside of said longitudinal slits, said lateral parts being attached to said basic body.

5. The windshield wiper system according to claim 4, wherein said lateral parts are attached to said basic body at defined connecting locations, said tongue extending beyond said connecting locations of said lateral parts at said basic body towards said pivot bearing.

6. The windshield wiper system according to claim 3, including two lateral parts formed laterally outside of said longitudinal slits, said lateral parts being integrally formed in one piece with said basic body, and each said lateral parts having predetermined bending locations formed thereon at a point of attachment between said lateral part and said basic body.

7. The windshield wiper system according to claim 2, wherein said springy tongue is a tongue member attached at a bottom portion of said wiper arm member.

8. The windshield wiper system according to claim 1, wherein said cam follower means are formed as a bump provided on said wiper arm member and pointing towards said control cam.

9. The windshield wiper system according to claim 1, including a helical spring supported on said wiper arm member, and a pin forming said cam follower means, said pin being shiftably supported in said basic body and being biased against said control cam surface by said helical spring.

10. The windshield wiper system according to claim 1, wherein said control cam is formed on said pivot bearing and said cam follower means are formed on said wiper arm member.

11. A windshield wiper system for passenger vehicles, comprising a wiper arm having a free end, means for oscillatingly driving said wiper arm across a windshield of a passenger vehicle about a given pivot axis opposite said free end, and a wiper blade disposed at said free end of said wiper arm; means for telescopically extending said wiper arm such that said free end travels along a substantially horizontal line across a windshield during an oscillatory motion of said wiper arm across the windshield as said wiper arm is pivoted about said pivot axis; said driving means including a pivot bearing mounted on the passenger vehicle and a driven basic body disposed on and pivotable about said pivot bearing; said wiper arm including a wiper arm member attached to said basic body and means for resiliently biasing said wiper blade towards the windshield; a control cam with a cam surface and cam follower means for following the cam surface of said control cam during an oscillatory motion of said wiper arm across the windshield and for varying a contact pressure of said wiper arm and said wiper blade onto the windshield, one of said control cam and cam follower means being disposed at said pivot bearing and the other of said control cam and cam follower means being attached to said wiper arm; and wherein said wiper arm member is formed by a leaf spring rigidly connected with said basic body and is attached to said cam follower means.

12. The windshield wiper system according to claim 11, wherein said control cam is formed on said pivot bearing and said cam follower means are formed on said wiper arm member.

\* \* \* \* \*